United States Patent
Rong et al.

(10) Patent No.: US 11,276,139 B2
(45) Date of Patent: Mar. 15, 2022

(54) WAY TO GENERATE IMAGES WITH DISTORTION FOR FISHEYE LENS

(71) Applicant: Baidu USA LLC, Sunnyvale, CA (US)

(72) Inventors: Guodong Rong, Sunnyvale, CA (US); Peitao Zhao, Sunnyvale, CA (US); Jaewon Jung, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 64 days.

(21) Appl. No.: 16/693,070

(22) Filed: Nov. 22, 2019

(65) Prior Publication Data

US 2021/0158474 A1    May 27, 2021

(51) Int. Cl.
    *G06T 3/00* (2006.01)
    *G06T 7/90* (2017.01)
    *G06T 11/40* (2006.01)

(52) U.S. Cl.
    CPC ............. *G06T 3/0018* (2013.01); *G06T 7/90* (2017.01); *G06T 11/40* (2013.01); *G06T 2207/20081* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 8,463,020 B1 * | 6/2013 | Schuckmann | ........... | G06K 9/00 382/154 |
| 10,460,208 B1 * | 10/2019 | Atsmon | ............... | G06K 9/6262 |
| 11,100,371 B2 * | 8/2021 | Atsmon | ................... | G06N 3/08 |
| 2011/0273528 A1 * | 11/2011 | Sazawa | .................... | G06T 15/20 348/36 |
| 2020/0134331 A1 * | 4/2020 | Poddar | ............... | G06K 9/00812 |
| 2020/0202498 A1 * | 6/2020 | Raduta | .................. | G06T 3/0018 |
| 2020/0210779 A1 * | 7/2020 | Atsmon | ............. | G06K 9/00791 |
| 2021/0158474 A1 * | 5/2021 | Rong | ...................... | G06T 11/40 |

FOREIGN PATENT DOCUMENTS

CN      110648274 A   *   1/2020

OTHER PUBLICATIONS

Distortion (optics), https://en.wikipedia.org/w/index.php?title=Distortion_(optics)&oldid=1002224128 (last visited Apr. 22, 2021). (Year: 2021).*

Perspective distortion (photography), https://en.wikipedia.org/w/index.php?title=Perspective_distortion_(photography)&oldid=903901673 (last visited Apr. 22, 2021). (Year: 2021).*

* cited by examiner

*Primary Examiner* — Tahmina N Ansari
(74) *Attorney, Agent, or Firm* — Womble Bond Dickinson (US) LLP

(57) ABSTRACT

A method, apparatus, and system for generating a target distorted image from a synthetic distortion-less source cubemap image is disclosed. A synthetic distortion-less source cubemap image is generated. For each pixel on a target distorted image, a pixel on the source cubemap image that corresponds to the pixel on the target distorted image is determined. For each pixel on the target distorted image, a color of the corresponding pixel on the source cubemap image is determined. Thereafter, a same color as the determined color of the corresponding pixel on the source cubemap image is filled in at each pixel on the target distorted image.

20 Claims, 14 Drawing Sheets

WAY TO GENERATE IMAGES WITH DISTORTION FOR FISHEYE LENS

TECHNICAL FIELD

Embodiments of the present disclosure relate generally to operating autonomous vehicles. More particularly, embodiments of the disclosure relate to generating lens-distorted synthetic images for training the perception module for autonomous driving.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

The perception module is a key component in the stack of autonomous driving. Artificial Intelligence (AI) algorithms used in the perception module requires a large amount of labeled image for training. Manual labeling is both time-consuming and costly, and can be inaccurate. Accordingly, synthetic data (e.g., data generated by a game engine such as the Unity engine or the Unreal engine) are used in the art to in the generation of labeled data. The labeled data is used in the training of the perception module to help improve its performance.

Lens distortion (e.g., the radial distortion) is inevitable in images captured using physical cameras. Therefore, ideally the perception module should be trained with images that embody real world lens distortion, so that the trained perception module can properly handle images captured by real cameras. Therefore, a simulation system that generates synthetic images to be used in the training of the perception module should incorporate the correct lens distortion.

Known techniques exist to generate a properly distorted image from a distortion-less image. However, generating distortion for the fisheye lens can still be a challenge. Hereinafter a fisheye lens refers to an ultra wide-angle lens that can help create a wide panoramic or hemispherical image with a strong visual distortion. It is a challenge to generate distorted images from distortion-less images for the fisheye lens because the fisheye lens usually has a very large field of view (FOV): the FOV of a fisheye lens can be close to or even greater than 180°. The large FOV means with the conventional techniques a distortion-less image with a very large resolution is required to generate a distorted image for the fisheye lens. The required resolution approaches infinity as the FOV of the lens increases towards 180°. A distortion-less image with a FOV greater than 180° does not exist.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a method, apparatus, and system for generating a target distorted image from a synthetic distortion-less source cubemap image is disclosed. A synthetic distortion-less source cubemap image is generated. For each pixel on a target distorted image, a pixel on the source cubemap image that corresponds to the pixel on the target distorted image is determined. For each pixel on the target distorted image, a color of the corresponding pixel on the source cubemap image is determined. Thereafter, a same color as the determined color of the corresponding pixel on the source cubemap image is filled in at each pixel on the target distorted image.

In one embodiment, to determine the pixel on the source cubemap image that corresponds to the pixel on the target distorted image for each pixel on the target distorted image, the pixel on the target distorted image is projected from an image plane to a normalized plane. A location of a corresponding pixel on a distortion-less normalized plane is determined using inverse distortion. The corresponding pixel on the distortion-less normalized plane is then projected to a unit sphere. A three-dimensional (3D) vector of the projected pixel on the unit sphere is determined. The pixel on the source cubemap image that corresponds to the 3D vector is determined as the pixel on the source cubemap image that corresponds to the pixel on the target distorted image.

In one embodiment the target distorted image embodies radial lens distortion of a fisheye lens. In one embodiment, the fisheye lens has a field of view (FOV) exceeding 180 degrees. In one embodiment, the color of the corresponding pixel on the source cubemap image is in a red green blue (RGB) color space. In one embodiment, the target distorted image is used to train a perception module for autonomous driving.

Figure 1:
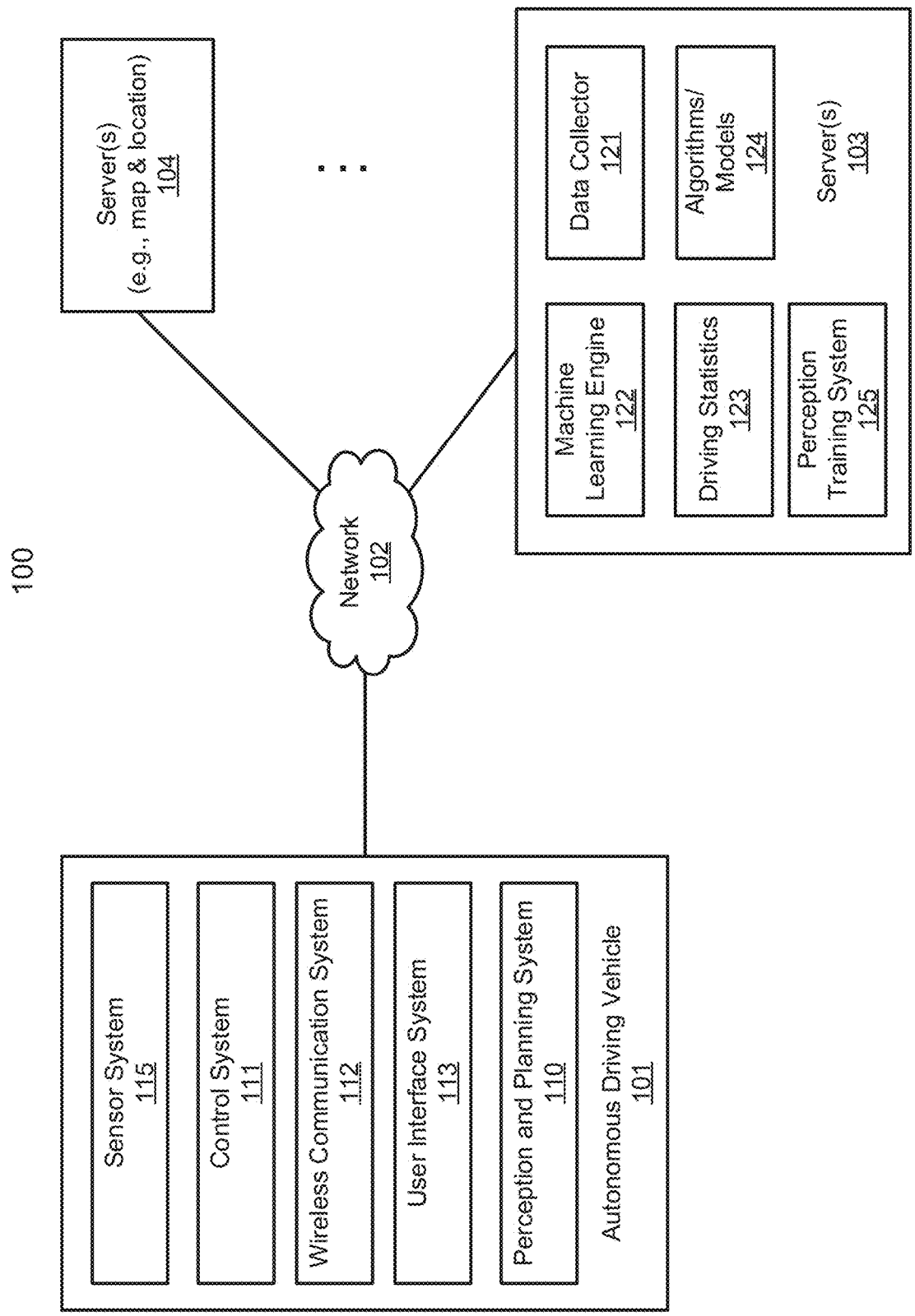
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
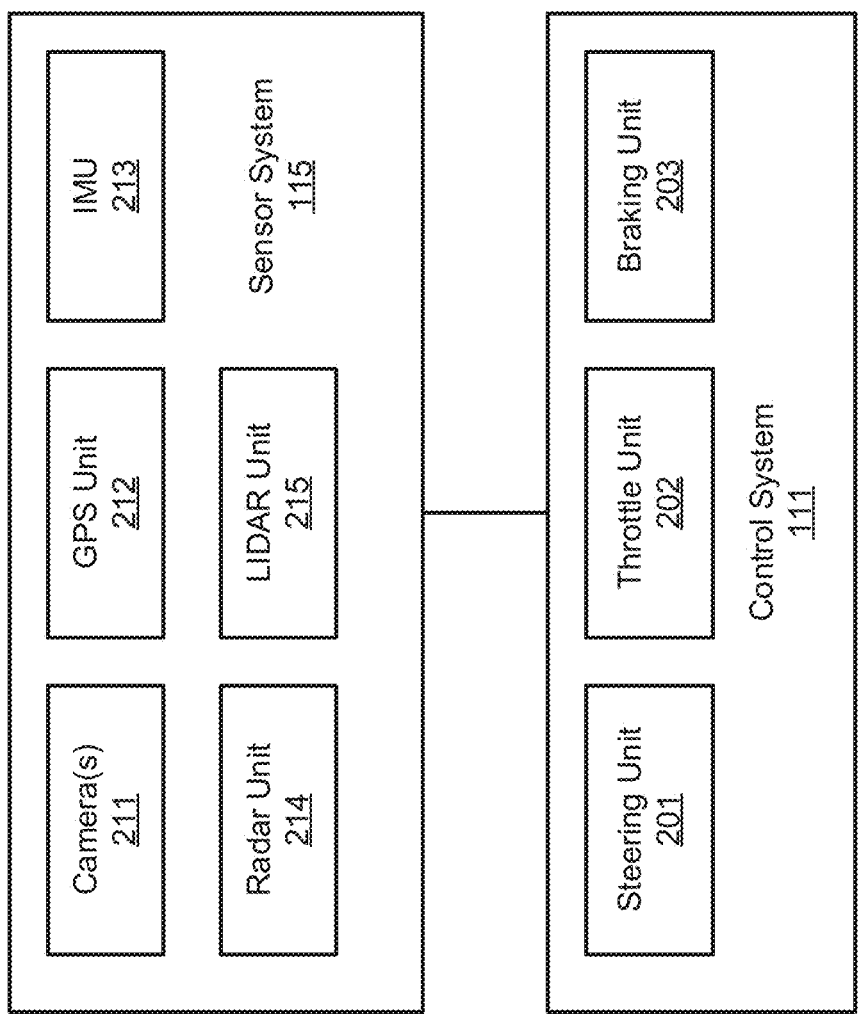
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In particular, the images generated according to embodiments of the disclosure can be used at the machine learning engine 122 to generate or train rules, algorithms, and/or predictive models 124 to improve the perception abilities of the ADV. Perception training system or module 125 is configured to train a perception module or model to perform perception of obstacles based on the images captured by sensors. Algorithms 124 can then be uploaded on ADVs to be utilized during autonomous driving in real-time.

Figure 3A:
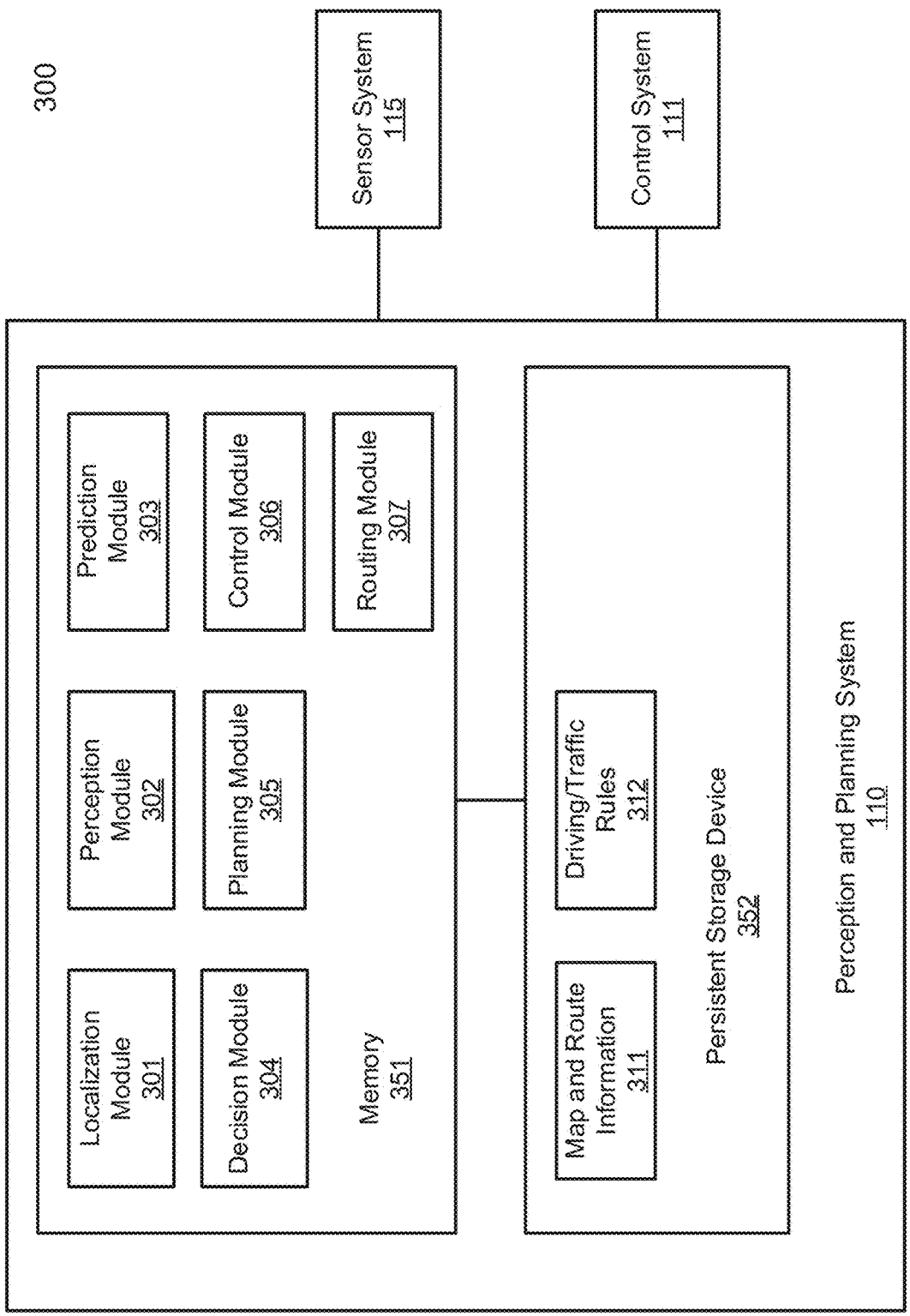
FIGS. 3A-3B are block diagrams illustrating an example of a perception and planning system used with an autonomous vehicle according to one embodiment.
Figure 3B:
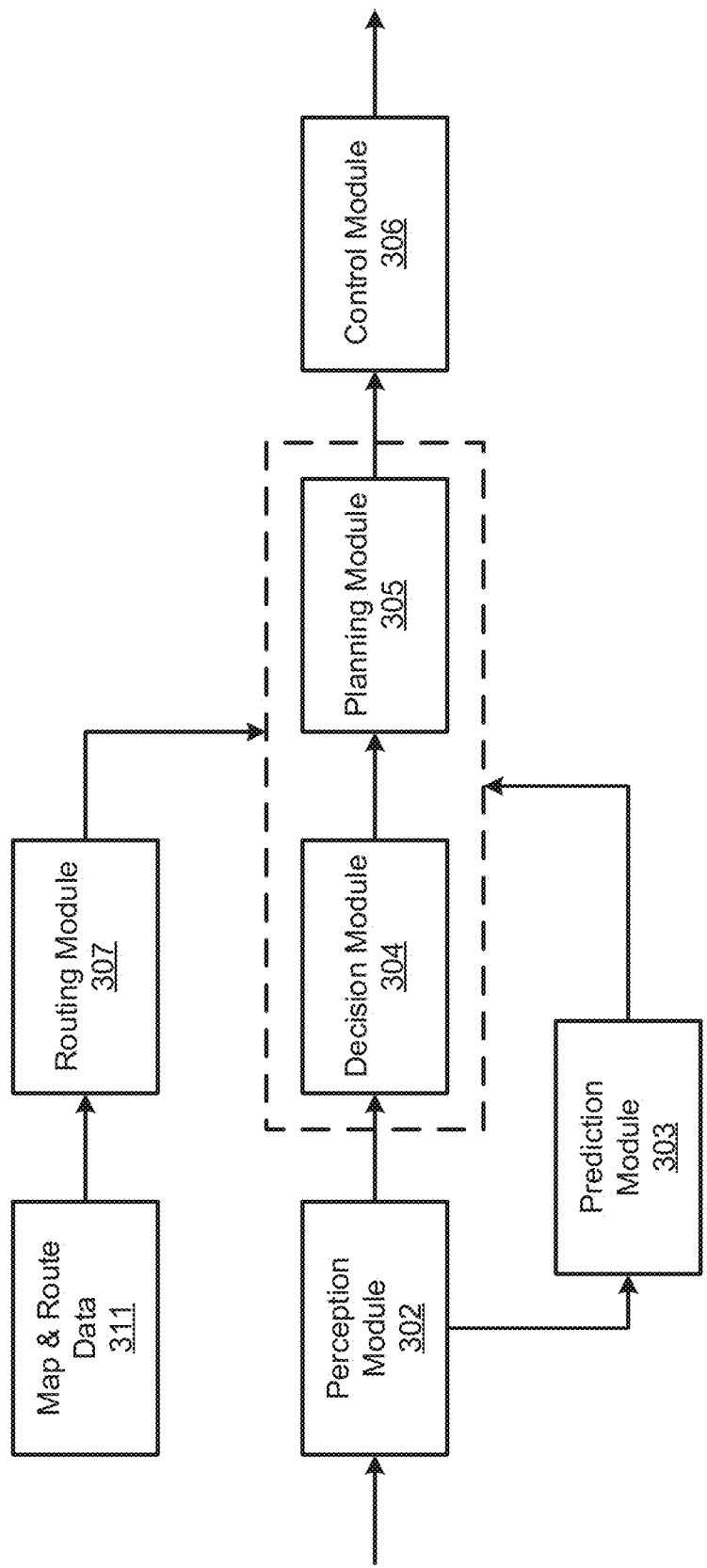

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Techniques are known in the art to generate a distortion-less synthetic image (i.e., a two-dimensional "2D" image), and distort it based on the distortion that would be introduced by a real-world physical camera to obtain a distorted image.

Figure 4:
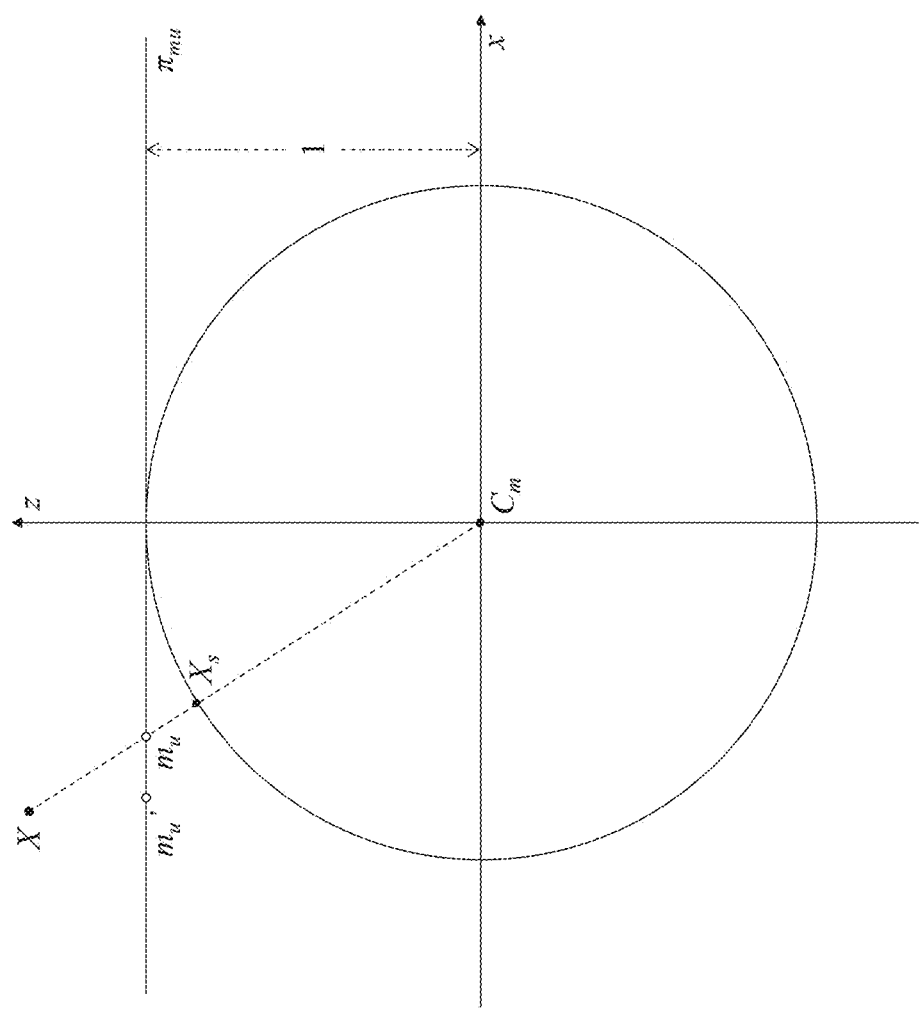
FIG. 4 is a diagram illustrating a conventional lens distortion model.

Referring to FIG. 4, a diagram illustrating a conventional lens distortion model 400 is shown. As is shown in FIG. 4, a world point in a mirror frame is projected onto a unit sphere, $X \Rightarrow X_s$ in the frame $F_m$ that is centered at $C_m$ (0, 0, 0). In particular, $X_s$ can be calculated as follows:

$$X_s = \frac{X}{|X|} \text{ or } \begin{cases} x_s = \frac{x}{\sqrt{x^2 + y^2 + z^2}} \\ y_s = \frac{y}{\sqrt{x^2 + y^2 + z^2}} \\ z_s = \frac{z}{\sqrt{x^2 + y^2 + z^2}} \end{cases}$$

Then, the projected point on the unit sphere can be further projected onto a normalized plane $\pi_{mu}$ (corresponding to the plane of the distortion-less image), $X_s \Rightarrow m_u$. In particular, $m_u$ can be calculated as follows:

$$mu: \begin{cases} x_{m_u} = \dfrac{x_S}{z_S} = \dfrac{x}{z} \\ y_{m_u} = \dfrac{y_S}{z_S} = \dfrac{y}{z} \\ z_{m_u} = 1 \end{cases}$$

Distortion removal can be achieved with a final projection $m_u \Rightarrow m_u'$, or $m_u:(x, y) \Rightarrow m_u':(x', y')$. In particular, with the Plum Bob model, $m_u':(x', y')$ can be calculated as follows:

$$\begin{cases} x' \approx x(1 + k_1 r^2 + k_2 r^4 + k_3 r^6 + k_4 r^8) \\ y' \approx y(1 + k_1 r^2 + k_2 r^4 + k_3 r^6 + k_4 r^8) \end{cases}$$

(omitting tangential distortion and higher order radial distortion), where $r = \sqrt{x^2 + y^2}$.

Accordingly, the conventional technique for generating a distorted image that embodies the lens radial distortion from a synthetic distortion-less image can be performed as follows. First, a synthetic distortion-less source 2D image is generated. For each pixel (u', v') in the target distorted image, an inverse distortion process is performed to obtain the corresponding pixel (u, v) in the source image. Thereafter, the color of the pixel (u, v) in the source image is determined, and is filled into the target distorted image at the pixel (u', v'). The formulas used in the inverse distortion process are provided as follows:

$$\begin{cases} x \approx x'(1 + b_1 r'^2 + b_2 r'^4 + b_3 r'^6 + b_4 r'^8) \\ y \approx y'(1 + b_1 r'^2 + b_2 r'^4 + b_3 r'^6 + b_4 r'^8) \end{cases},$$

where $r' = \sqrt{x'^2 + y'^2}$, and $$\begin{cases} b_1 = -k_1 \\ b_2 = 3k_1^2 - k_2 \\ b_3 = 8k_1 k_2 - 12k_1^3 - k_3 \\ b_4 = 55k_1^4 + 10k_1 k_3 - 55k_1^2 k_2 + 5k_2^2 - k_4 \end{cases},$$

where $k_1$, $k_2$, $k_3$, and $k_4$ are 1st to 4th order radial distortion coefficients.

The radial distortion coefficients can be determined empirically. The process is performed for all pixels in the target distorted image. It should be appreciated that some pixels at the edges of the target distorted image have no corresponding pixels in the distortion-less source image. Accordingly, the target distorted image is generally cropped to remove the blank edge pixels.

Figure 5A:
FIGS. 5A-C are diagrams illustrating the conventional method for generating a distorted image from a distortion-less image.
Figure 5B:
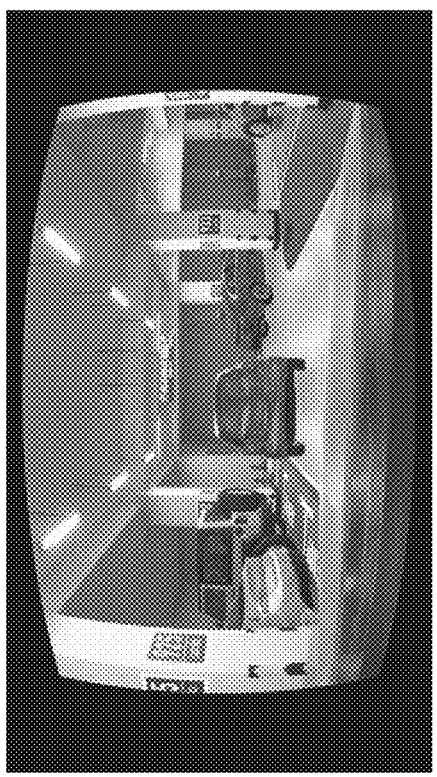
Figure 5C:
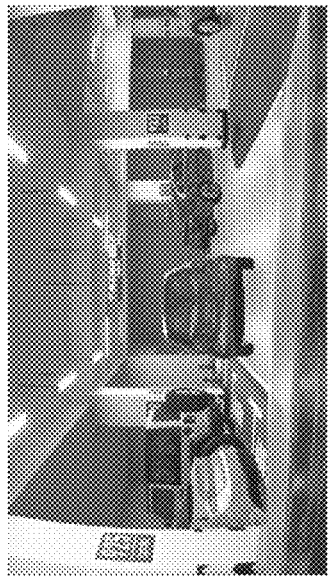

Referring to FIGS. 5A-C, diagrams 500A-500C illustrating the conventional method for generating a distorted image from a distortion-less image are shown. FIG. 5A illustrates a synthetic distortion-less source 2D image 500A with a resolution of 2578×1450. FIG. 5B illustrates a target distorted image 500B at the same resolution of 2578×1450. As can be seen in FIG. 5B, pixels at the edges are blank because they do not have corresponding pixels in the source image 500A. FIG. 5C illustrates a distorted image 500C at a resolution of 1920×1080 that is obtained by cropping the target distorted image 500B of FIG. 5B and keeping only the central portion.

The known techniques including the above-described conventional technique for generating distorted images generally work for normal cameras with moderate FOVs (usually, for FOVs<=120°). However, when the FOV increases, as is the case with the fisheye camera/lens, the required resolution of the distortion-less image increases exponentially, and can approach infinity as the FOV increases towards 180°. As a result, the known techniques for generating the distorted image are impractical for the fisheye camera (which can have an FOV close to or even greater than 180°). Because a distortion-less image with a FOV greater than 180° does not exist, the known techniques cannot be used at all for cases where the FOV is greater than 180°.

Referring to FIGS. 6A-D, diagrams 600A-600D illustrating a unified projection model according to one embodiment are shown. A world point in a mirror frame is projected onto a unit sphere, $X \Rightarrow X_s$ in the frame $F_m$ that is centered at $C_m$ (0, 0, 0). In particular, $X_s$ can be calculated as follows:

$$X_s = \dfrac{X}{|X|} \text{ or } \begin{cases} x_s = \dfrac{x}{\sqrt{x^2 + y^2 + z^2}} \\ y_s = \dfrac{y}{\sqrt{x^2 + y^2 + z^2}} \\ z_s = \dfrac{z}{\sqrt{x^2 + y^2 + z^2}} \end{cases}$$

The point is then changed to a new reference frame $F_p$ centered at $C_p$ (0, 0, $\xi$), $(X_s)F_m \Rightarrow (X_s)F_p$:

$$\begin{cases} x_{s_p} = x_{s_m} \\ y_{s_p} = y_{s_m} \\ z_{s_p} = z_{s_m} + \xi \end{cases}$$

Next, the projected point on the unit sphere in the reference frame $F_p$ can be further projected onto a normalized plane $\pi_{m_u}$ (corresponding to the plane of the distortion-less image), $(X_s)F_p \Rightarrow m_u$. In particular, $m_u$ can be calculated as follows:

$$mu: \begin{cases} x_{m_u} = \dfrac{x_{s_p}}{z_{s_p}} = \dfrac{x_{s_m}}{z_{s_m} + \xi} \\ y_{m_u} = \dfrac{y_{s_p}}{z_{s_p}} = \dfrac{y_{s_m}}{z_{s_m} + \xi} \\ z_{m_u} = 1 \end{cases}$$

Distortion removal can be achieved in the same way as described above in relation to the conventional method, i.e., with a final projection $m_u \Rightarrow m_u'$, or $m_u:(x, y) \Rightarrow m_u':(x', y')$. In particular, with the Plum Bob model, $m_u':(x', y')$ can be calculated as follows:

$$\begin{cases} x' \approx x(1 + k_1 r^2 + k_2 r^4 + k_3 r^6 + k_4 r^8) \\ y' \approx y(1 + k_1 r^2 + k_2 r^4 + k_3 r^6 + k_4 r^8) \end{cases}$$

(omitting tangential distortion and higher order radial distortion), where $r = \sqrt{x^2 + y^2}$.

Accordingly, the conventional method for generating a distorted image that embodies the lens radial distortion from a synthetic distortion-less image can be performed as follows. First, a synthetic distortion-less source 2D image is generated. For each pixel (u', v') in the target distorted image, an inverse distortion is performed to obtain the corresponding pixel (u, v) in the source image. Thereafter, the color of the pixel (u, v) in the source image is obtained, and is filled into the target distorted image at the pixel (u', v'). The formulas used in the inverse distortion process are provided as follows:

$$\begin{cases} x \approx x'(1 + b_1 r'^2 + b_2 r'^4 + b_3 r'^6 + b_4 r'^8) \\ y \approx y'(1 + b_1 r'^2 + b_2 r'^4 + b_3 r'^6 + b_4 r'^8) \end{cases},$$

where $r' = \sqrt{x'^2 + y'^2}$, and $$\begin{cases} b_1 = -k_1 \\ b_2 = 3k_1^2 - k_2 \\ b_3 = 8k_1 k_2 - 12k_1^2 - k_3 \\ b_4 = 55k_1^4 + 10k_1 k_3 - 55k_1^2 k_2 + 5k_2^2 - k_4 \end{cases},$$

where $k_1$, $k_2$, $k_3$, and $k_4$ are 1st to 4th order radial distortion coefficients.

Figure 6A:
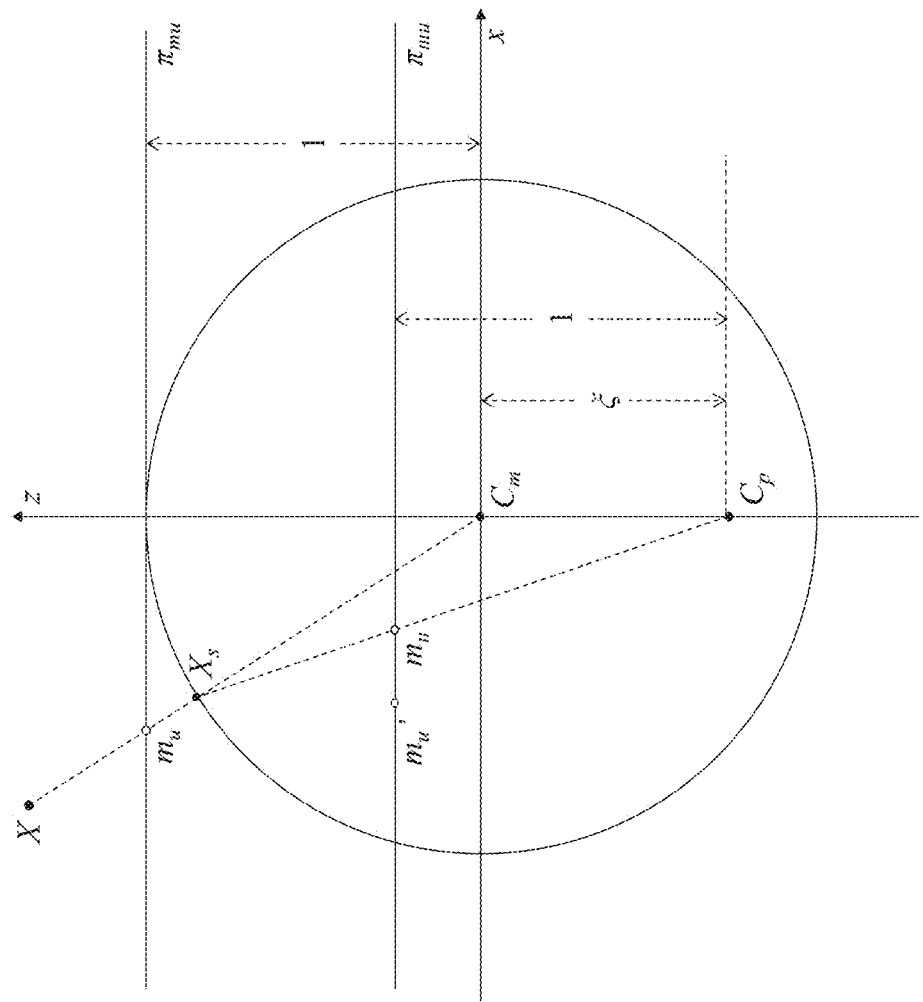
FIGS. 6A-D are diagrams illustrating a unified projection model according to one embodiment.
Figure 6B:
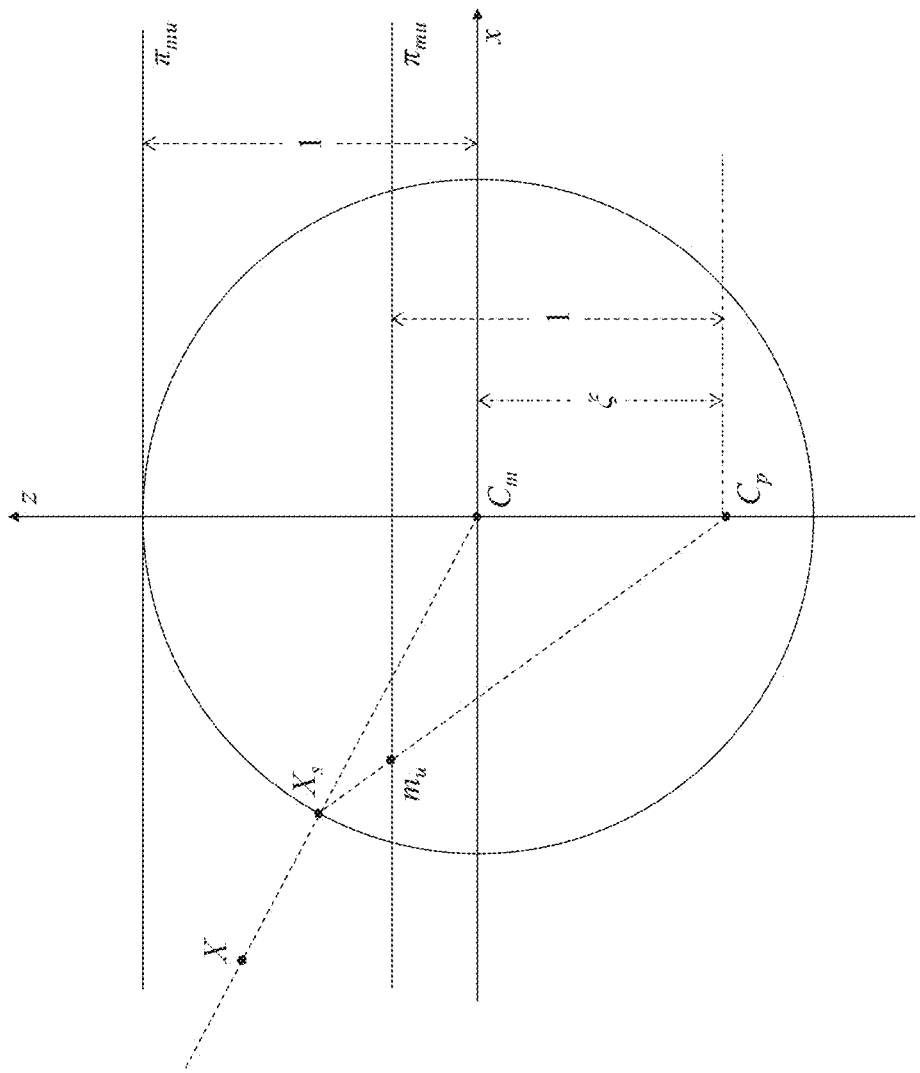
Figure 6C:
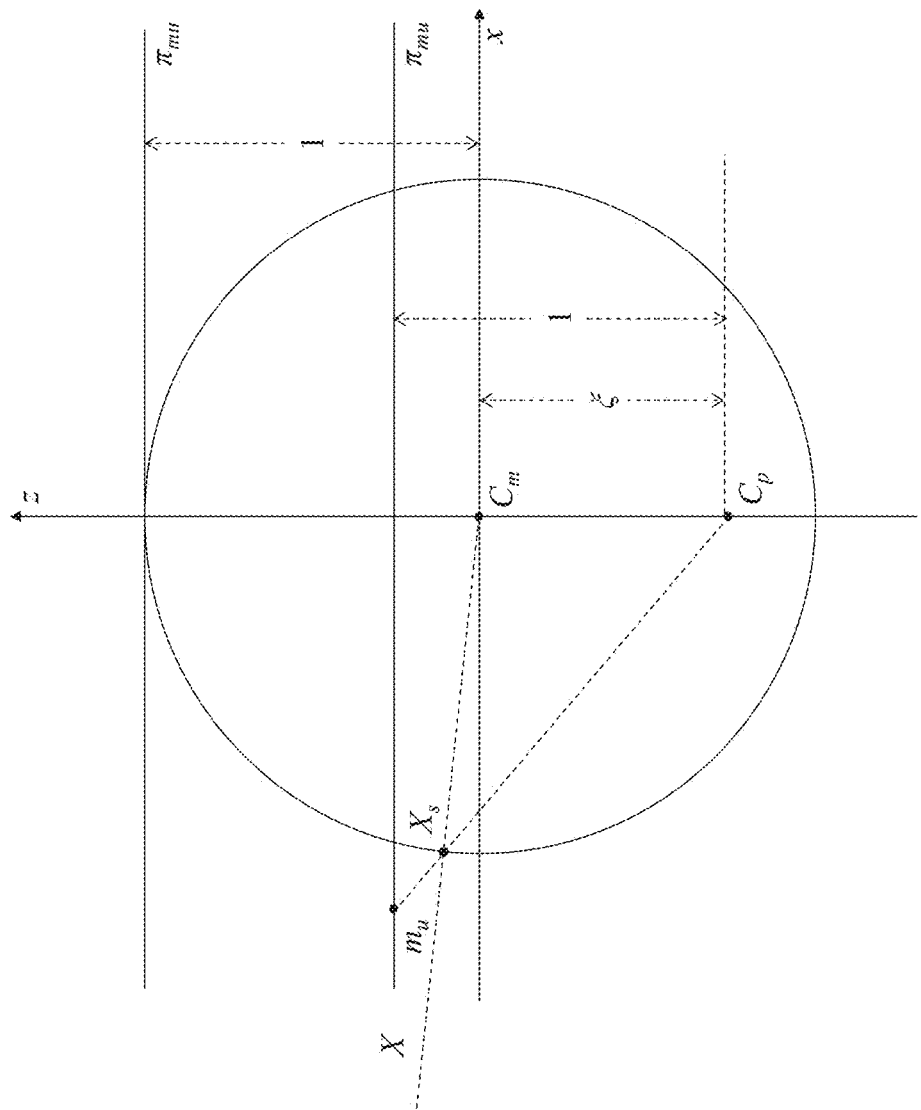
Figure 6D:
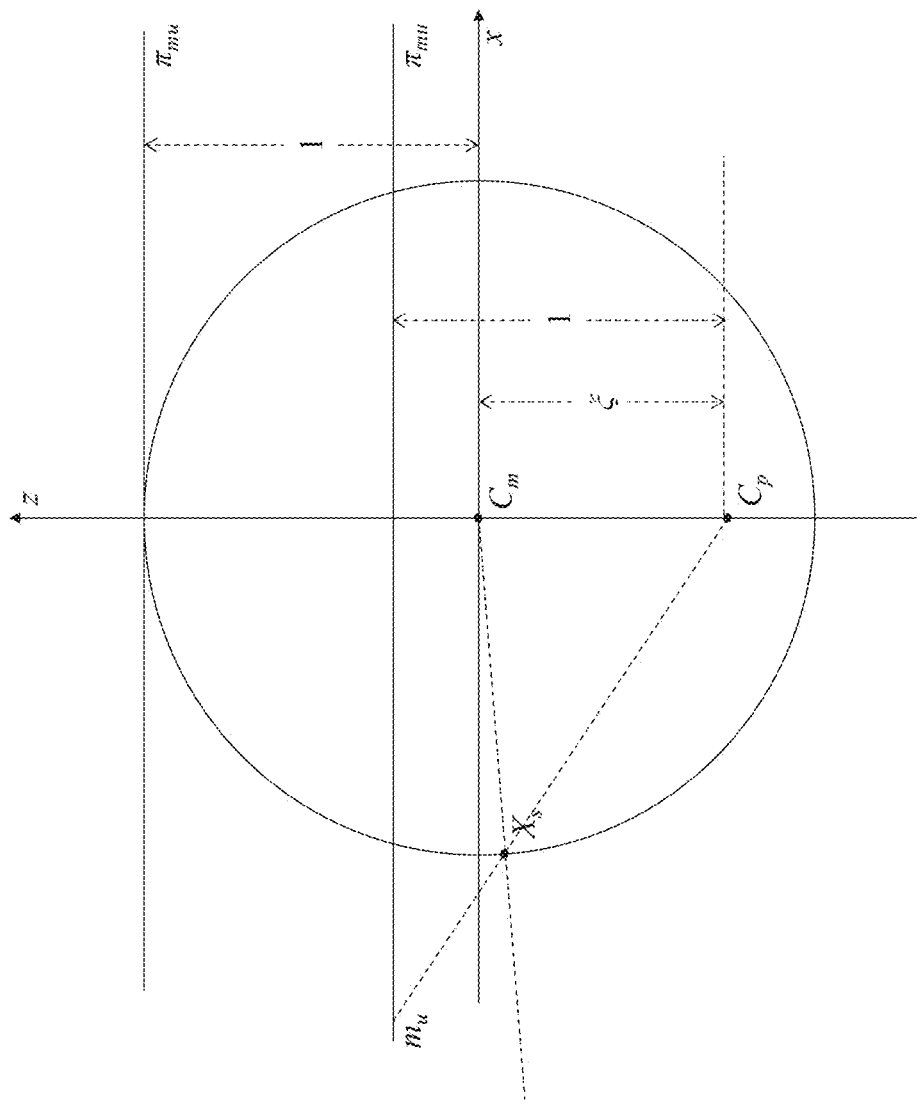

However, generating the distorted image for a camera with a very large FOV (e.g., a fisheye camera) using inverse distortion with the same normalized plane $\pi_{mu}$ can be impractical, especially when the FOV approaches or even exceeds 180°. As shown in FIGS. 6B and 6C, the required resolution of the distortion-less image increases exponentially as the lens FOV increases, and can approach infinity as the FOV increases towards 180°. FIG. 6D illustrates a case where the lens FOV exceeds 180°: a distortion-less image at the normalized plane $\pi_{mu}$ with a FOV greater than 180° does not exist.

Figure 7:
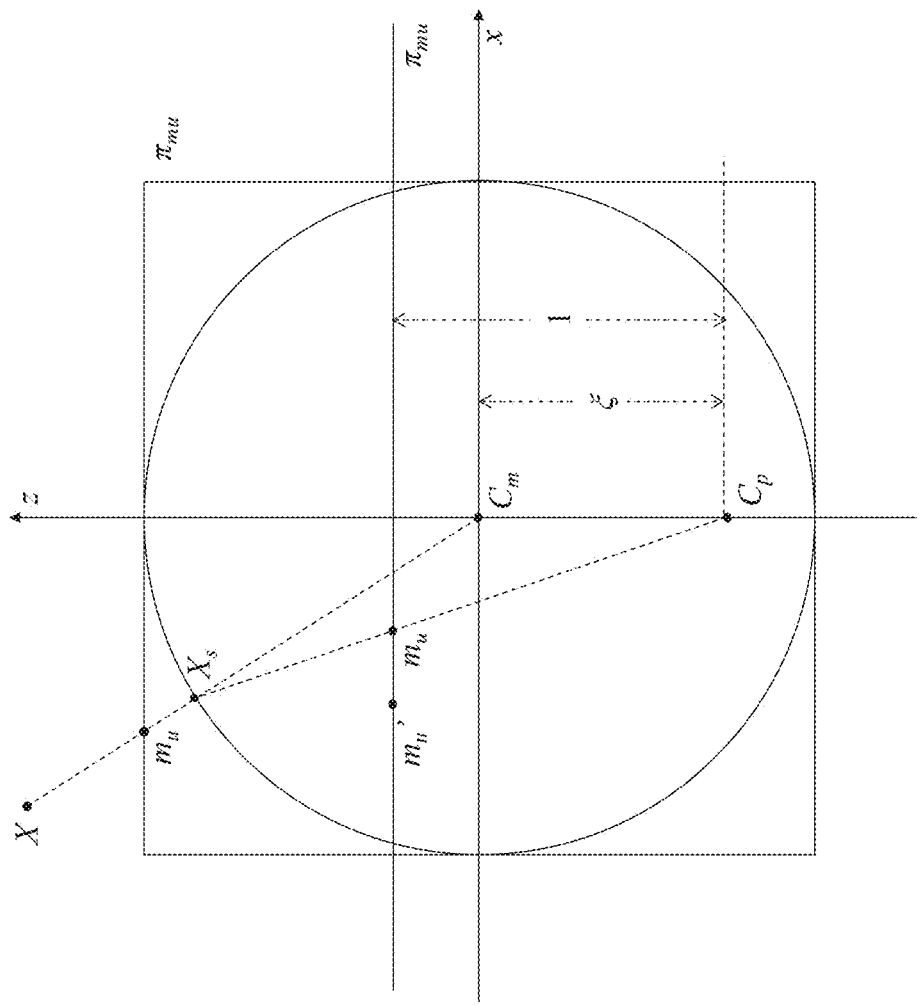
FIG. 7 is a diagram illustrating a projection model incorporating a cubemap image according to one embodiment.

Referring to FIG. 7, a diagram 700 illustrating a projection model incorporating a cubemap image according to one embodiment is shown. Compared to diagrams illustrated in FIGS. 6A-D, in FIG. 7, the distortion-less image at the normalized plane $\pi_{mu}$ is replaced with a distortion-less cubemap image. A cubemap image, or a cubemap, refers to a collection of six square textures that represent the reflections on an environment. The six squares form the faces of an imaginary cube that surrounds an object. Each face represents the view along the directions of the world axes (up, down, left, right, forward and back). The views of each face is associated with a 90-degree view frustum. Accordingly, a distorted image that embodies the lens radial distortion of a lens with a very large FOV can be generated from a synthetic distortion-less cubemap image as follows. First, a synthetic distortion-less source cubemap image is generated. For each pixel (u', v') in the target distorted image, an inverse distortion process is performed to obtain the corresponding pixel (u, v) in the normalized plane $\pi_{mu}$. The formulas used in the inverse distortion process are the same as described above in relation to the conventional method, and are provided again as follows:

$$\begin{cases} x \approx x'(1 + b_1 r'^2 + b_2 r'^4 + b_3 r'^6 + b_4 r'^8) \\ y \approx y'(1 + b_1 r'^2 + b_2 r'^4 + b_3 r'^6 + b_4 r'^8) \end{cases},$$

where $r' = \sqrt{x'^2 + y'^2}$, and $$\begin{cases} b_1 = -k_1 \\ b_2 = 3k_1^2 - k_2 \\ b_3 = 8k_1 k_2 - 12k_1^2 - k_3 \\ b_4 = 55k_1^4 + 10k_1 k_3 - 55k_1^2 k_2 + 5k_2^2 - k_4 \end{cases},$$

where $k_1$, $k_2$, $k_3$, and $k_4$ are 1st to 4th order radial distortion coefficients.

Next, the projection $(X_s)F_p \Rightarrow m_u$ described above is reversed, $m_u \Rightarrow (X_s)F_p$. In particular, $X_s$ in frame $F_p$, $(X_s)F_p$, can be calculated as follows:

$$(X_s)F_p : \begin{cases} x_s = \dfrac{\xi + \sqrt{1 + (1-\xi^2)(x_{m_u}^2 + y_{m_u}^2)}}{x_{m_u}^2 + y_{m_u}^2 + 1} x_{m_u} \\ y_s = \dfrac{\xi + \sqrt{1 + (1-\xi^2)(x_{m_u}^2 + y_{m_u}^2)}}{x_{m_u}^2 + y_{m_u}^2 + 1} y_{m_u} \\ z_s = \dfrac{\xi + \sqrt{1 + (1-\xi^2)(x_{m_u}^2 + y_{m_u}^2)}}{x_{m_u}^2 + y_{m_u}^2 + 1} - \xi \end{cases}$$

Therefore, the pixel on the cubemap image that corresponds to the three-dimensional (3D) vector ($x_s$, $y_s$, $z_s$) corresponds to the pixel (u', v') in the target distorted image. It should be appreciated that the pixel on the cubemap image that corresponds to a particular 3D vector is the pixel on the cubemap image that intersects the 3D vector emanating from the center of the cubemap in the 3D cubic form. Thereafter, the color of the pixel on the cubemap image that corresponds to the three-dimensional (3D) vector ($x_s$, $y_s$, $z_s$) is obtained, and is filled into the target distorted image at the pixel (u', v').

Figure 8A:
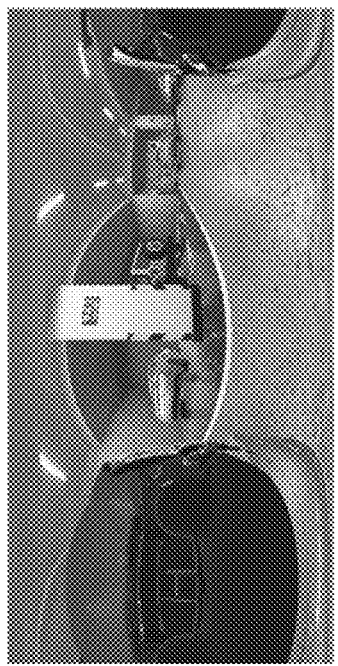
FIGS. 8A-C are diagrams illustrating a method for generating a distorted image for a camera with a large FOV (e.g., a fisheye camera) from a distortion-less cubemap image according to one embodiment.
Figure 8B:
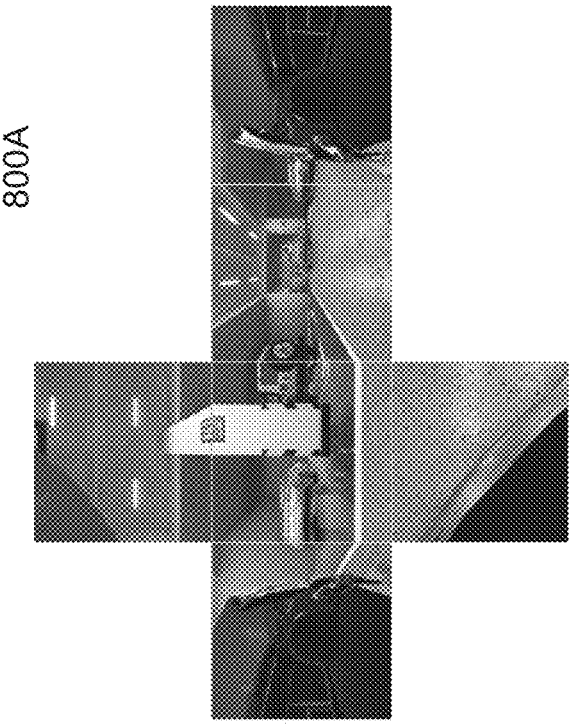
Figure 8C:
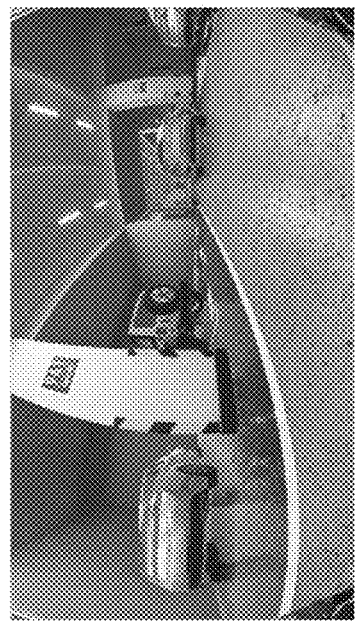

Referring to FIGS. 8A-C, diagrams 800A-800C illustrating a method for generating a distorted image for a camera with a large FOV (e.g., a fisheye camera) from a distortion-less cubemap image according to one embodiment are shown. FIG. 8A illustrates a synthetic distortion-less source cubemap image 800A. FIG. 8B illustrates the synthetic distortion-less source cubemap image in the equirectangular format. FIG. 8C illustrates a target distorted image 800C generated from the distortion-less source cubemap image 800A with the method according to one embodiment as described above.

Figure 9:
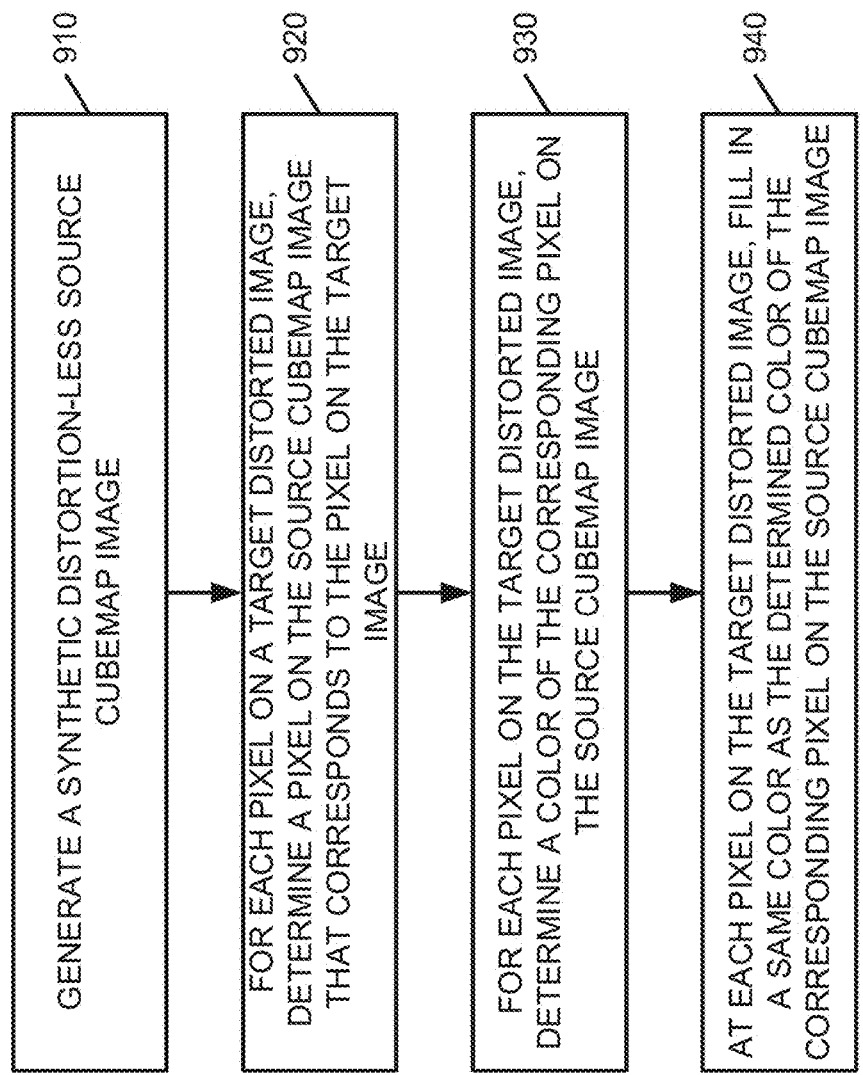
FIG. 9 is a flowchart illustrating an example method for generating a target distorted image from a distortion-less cubemap image according to one embodiment.

Referring to FIG. 9, a flowchart illustrating an example method 900 for generating a target distorted image from a distortion-less cubemap image according to one embodiment is shown. The process 900 can be implemented in hardware, software, or a combination thereof. At block 910, a synthetic distortion-less source cubemap image is generated. At block 920, for each pixel on a target distorted image, a pixel on the source cubemap image that corresponds to the pixel on the target distorted image is determined. At block 930, for each pixel on the target distorted image, a color of the corresponding pixel on the source cubemap image is determined. Thereafter, at block 940, a same color as the determined color of the corresponding pixel on the source cubemap image is filled in at each pixel on the target distorted image.

Figure 10:
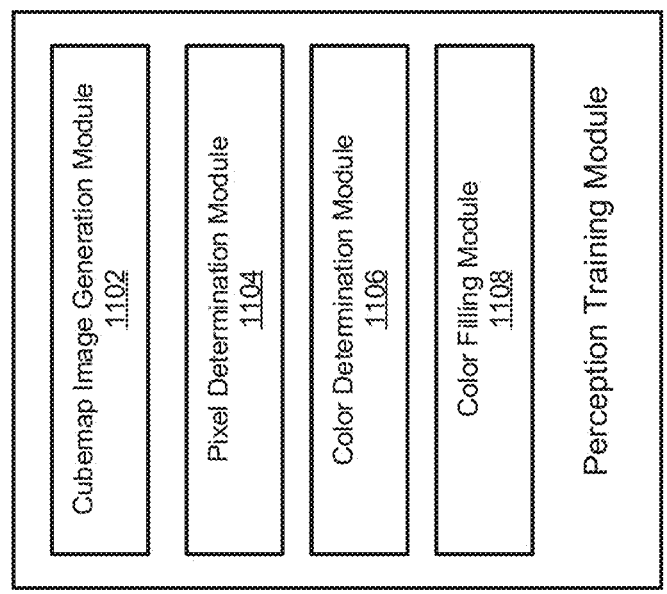
FIG. 10 is a block diagram illustrating an example apparatus according to one embodiment.

Referring to FIG. 10, a block diagram illustrating an example apparatus 1100 according to one embodiment is shown. Various modules illustrated in FIG. 10 can be implemented in either hardware or software. Perception training module 1100 may be implemented as part of perception training system 125 of FIG. 1 for training a perception system of an autonomous driving system such as perception module 302. Referring to FIG. 10, a cubemap image generation module 1102 is configured to generate a synthetic distortion-less source cubemap image. A pixel determination module 1104 is configured to determine, for each pixel on a target distorted image, a pixel on the source cubemap image that corresponds to the pixel on the target distorted image. A color determination module 1106 is configured to determine, for each pixel on the target distorted image, a color of the corresponding pixel on the source cubemap image. A color filling module 1108 is configured to fill in a same color as the determined color of the corresponding pixel on the source cubemap image at each pixel on the target distorted image.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for generating a distorted image for an autonomous driving vehicle, the method comprising:
generating a synthetic distortion-less source cubemap image; and
for each pixel on a target distorted image for a camera having a fisheye lens,
determining a pixel on the source cubemap image that corresponds to the pixel on the target distorted image,
determining a color of the corresponding pixel on the source cubemap image, and
filling in a same color as the determined color of the corresponding pixel on the source cubemap image, wherein the target distorted image is used to training a perception module of the autonomous driving vehicle, and wherein the autonomous driving vehicle is to be controlled to drive autonomously based on a perceived driving environment by the perception module.

2. The method of claim 1, wherein, for each pixel on the target distorted image, determining the pixel on the source cubemap image that corresponds to the pixel on the target distorted image comprises:
projecting the pixel on the target distorted image from an image plane to a normalized plane;
determining a location of a corresponding pixel on a distortion-less normalized plane using inverse distortion; and
projecting the corresponding pixel on the distortion-less normalized plane to a unit sphere.

3. The method of claim 2, further comprising:
determining a three-dimensional (3D) vector of the projected pixel on the unit sphere; and
determining the pixel on the source cubemap image that corresponds to the 3D vector as the pixel on the source cubemap image that corresponds to the pixel on the target distorted image.

4. The method of claim 3, wherein the target distorted image embodies radial lens distortion of a fisheye lens.

5. The method of claim 4, wherein the fisheye lens has a field of view (FOV) exceeding 180 degrees.

6. The method of claim 1, wherein the color of the corresponding pixel on the source cubemap image is in a red green blue (RGB) color space.

7. The method of claim 1, further comprising training a perception module for autonomous driving using the target distorted image.

8. A non-transitory machine-readable medium having instructions stored therein, which when executed by a processor, cause the processor to perform operations, the operations comprising:
generating a synthetic distortion-less source cubemap image; and
for each pixel on a target distorted image for a camera having a fisheye lens,
determining a pixel on the source cubemap image that corresponds to the pixel on the target distorted image,
determining a color of the corresponding pixel on the source cubemap image, and
filling in a same color as the determined color of the corresponding pixel on the source cubemap image, wherein the target distorted image is used to training a perception module of an autonomous driving vehicle, and wherein the autonomous driving vehicle is to be controlled to drive autonomously based on a perceived driving environment by the perception module.

9. The machine-readable medium of claim 8, wherein, for each pixel on the target distorted image, determining the pixel on the source cubemap image that corresponds to the pixel on the target distorted image comprises:
projecting the pixel on the target distorted image from an image plane to a normalized plane;
determining a location of a corresponding pixel on a distortion-less normalized plane using inverse distortion; and
projecting the corresponding pixel on the distortion-less normalized plane to a unit sphere.

10. The machine-readable medium of claim 9, wherein the operations further comprise:
determining a three-dimensional (3D) vector of the projected pixel on the unit sphere; and
determining the pixel on the source cubemap image that corresponds to the 3D vector as the pixel on the source cubemap image that corresponds to the pixel on the target distorted image.

11. The machine-readable medium of claim 10, wherein the target distorted image embodies radial lens distortion of a fisheye lens.

12. The machine-readable medium of claim 11, wherein the fisheye lens has a field of view (FOV) exceeding 180 degrees.

13. The machine-readable medium of claim 8, wherein the color of the corresponding pixel on the source cubemap image is in a red green blue (RGB) color space.

14. The machine-readable medium of claim 8, wherein the operations further comprise training a perception module for autonomous driving using the target distorted image.

15. A data processing system, comprising:
a processor; and
a memory coupled to the processor to store instructions, which when executed by the processor, cause the processor to perform operations, the operations including:
generating a synthetic distortion-less source cubemap image, and
for each pixel on a target distorted image for a camera having a fisheye lens,
determining a pixel on the source cubemap image that corresponds to the pixel on the target distorted image,
determining a color of the corresponding pixel on the source cubemap image, and
filling in a same color as the determined color of the corresponding pixel on the source cubemap image, wherein the target distorted image is used to training a perception module of an autonomous driving vehicle, and wherein the autonomous driving vehicle is to be controlled to drive autonomously based on a perceived driving environment by the perception module.

16. The system of claim 15, wherein, for each pixel on the target distorted image, determining the pixel on the source cubemap image that corresponds to the pixel on the target distorted image comprises:
projecting the pixel on the target distorted image from an image plane to a normalized plane;
determining a location of a corresponding pixel on a distortion-less normalized plane using inverse distortion; and
projecting the corresponding pixel on the distortion-less normalized plane to a unit sphere.

17. The system of claim 16, wherein the operations further comprise:
determining a three-dimensional (3D) vector of the projected pixel on the unit sphere; and
determining the pixel on the source cubemap image that corresponds to the 3D vector as the pixel on the source cubemap image that corresponds to the pixel on the target distorted image.

18. The system of claim 17, wherein the target distorted image embodies radial lens distortion of a fisheye lens.

19. The system of claim 18, wherein the fisheye lens has a field of view (FOV) exceeding 180 degrees.

20. The system of claim 15, wherein the color of the corresponding pixel on the source cubemap image is in a red green blue (RGB) color space.

* * * * *